US010394596B2

(12) United States Patent
Tsirkin et al.

(10) Patent No.: US 10,394,596 B2
(45) Date of Patent: Aug. 27, 2019

(54) TRACKING OF MEMORY PAGES BY A HYPERVISOR

(71) Applicant: Red Hat, Inc., Raleigh, NC (US)

(72) Inventors: Michael Tsirkin, Lexington, MA (US); Henri Han van Riel, Merrimack, NH (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/835,383

(22) Filed: Dec. 7, 2017

(65) Prior Publication Data

US 2019/0179657 A1 Jun. 13, 2019

(51) Int. Cl.
*G06F 9/455* (2018.01)
*G06F 12/109* (2016.01)
*G06F 12/1009* (2016.01)
*G06F 9/50* (2006.01)

(52) U.S. Cl.
CPC ........ *G06F 9/45558* (2013.01); *G06F 9/5016* (2013.01); *G06F 12/1009* (2013.01); *G06F 12/109* (2013.01); *G06F 2009/45583* (2013.01); *G06F 2009/45591* (2013.01); *G06F 2212/65* (2013.01)

(58) Field of Classification Search
CPC ....... G06F 9/45558; G06F 2009/45583; G06F 2009/45591; G06F 2212/65; G06F 2212/657; G06F 9/50; G06F 9/5016; G06F 12/10; G06F 12/1009; G06F 12/109
See application file for complete search history.

(56) References Cited

U.S. PATENT DOCUMENTS

| 8,788,739 | B2 | 7/2014 | Chang et al. |
| 8,812,907 | B1 | 8/2014 | Bissett et al. |
| 9,135,038 | B1 | 9/2015 | Uchronski et al. |
| 9,201,612 | B1 * | 12/2015 | Vincent ................. G06F 3/0662 |
| 9,552,233 | B1 | 1/2017 | Tsirkin et al. |
| 2006/0259734 | A1 * | 11/2006 | Sheu .................... G06F 12/1036 711/203 |
| 2009/0006505 | A1 * | 1/2009 | Scheer ................ G06F 12/0253 |

(Continued)

OTHER PUBLICATIONS

Yang, Y. (2016). "On Optimizations of Virtual Machine Live Storage Migration for the Cloud". Computer Science and Engineering: Theses, Dissertations, and Student Research. 101.University of Nebraska—Lincoln. retrieved from http://digitalcommons.unl.edu/cgi/viewcontent.cgi?article=1117&context=computerscidiss. Aug. 2, 2017. 134 pages.

(Continued)

*Primary Examiner* — Midys Rojas
*Assistant Examiner* — Khoa D Doan
(74) *Attorney, Agent, or Firm* — Lowenstein Sandler LLP

(57) ABSTRACT

An identification of one or more memory pages that are associated with the guest operating system may be received by a hypervisor and from a guest operating system. The hypervisor may receive a request from the guest operating system to initiate a tracking operation for the one or more memory pages. The tracking operation may be initiated for the one or more memory pages in response to receiving the request from the guest operating system. Furthermore, the one or more memory pages may be freed in view of the tracking operation that has been initiated by the hypervisor.

18 Claims, 6 Drawing Sheets

(56) References Cited

U.S. PATENT DOCUMENTS

| | | | | |
|---|---|---|---|---|
| 2009/0307459 | A1* | 12/2009 | Fleming | G06F 12/0223 711/203 |
| 2010/0250869 | A1* | 9/2010 | Adams | G06F 12/1063 711/154 |
| 2010/0250895 | A1* | 9/2010 | Adams | G06F 12/1009 711/207 |
| 2011/0016290 | A1* | 1/2011 | Chobotaro | G06F 9/45558 711/207 |
| 2011/0179082 | A1* | 7/2011 | Vaghani | G06F 16/1774 707/781 |
| 2011/0302577 | A1* | 12/2011 | Reuther | G06F 9/45558 718/1 |
| 2012/0110237 | A1* | 5/2012 | Li | G06F 9/45558 711/6 |
| 2012/0167080 | A1* | 6/2012 | Vilayannur | G06F 3/0608 718/1 |
| 2013/0031292 | A1* | 1/2013 | Van Riel | G06F 12/10 711/6 |
| 2013/0205106 | A1* | 8/2013 | Tati | G06F 3/061 711/159 |
| 2013/0219106 | A1* | 8/2013 | Vogan | G06F 12/0246 711/103 |
| 2014/0149634 | A1* | 5/2014 | Tosatti | G06F 9/45558 711/6 |
| 2014/0181461 | A1* | 6/2014 | Kegel | G06F 12/1009 711/207 |
| 2014/0325141 | A1* | 10/2014 | Liu | G06F 12/0246 711/112 |
| 2014/0331224 | A1* | 11/2014 | Robenko | G06F 9/45533 718/1 |
| 2015/0178207 | A1* | 6/2015 | Susarla | G06F 12/121 711/135 |
| 2016/0253197 | A1* | 9/2016 | Bonzini | G06F 9/45558 718/1 |
| 2017/0046185 | A1* | 2/2017 | Tsirkin | G06F 9/45558 |
| 2017/0046186 | A1* | 2/2017 | Tsirkin | G06F 9/45558 |
| 2017/0060437 | A1* | 3/2017 | Schuster | G06F 3/0608 |
| 2017/0090965 | A1* | 3/2017 | Tsirkin | G06F 9/45558 |
| 2018/0011797 | A1* | 1/2018 | Shi | G06F 9/45545 |

OTHER PUBLICATIONS

Zijlstra, P. (2012). "[PATCH 6/8] Sched, Numa, MM: Implement Constant, Per task Working Set Sampling (WSS) Rate". LKML.org. retrieved from https://lkml.org/lkml/2012/11/12/323. Aug. 2, 2017. 3 pages.

Unknown. (2012). "[PATCH 00/27]—Latest Numa/Core Release, V16". retrieved from https://groups.google.com/forum/#!topic/fa.linux.kernel/YUnka2RelA0%5B1-25%5D. Aug. 2, 2017. 1 page.

Yang, J. et al. (2008) "Using Hypervisor to Provide Data Secrecy for User Applications on a Per-Page Basis." University of Michigan. retrieved from https://pdfs.semanticscholar.org/b151/b6b5438f2cbce2ec8b58a9335af2f9cd62d6.pdf. Aug. 2, 2017. 10 pages.

Molnar, Ingo, "[PATCH 00/27] Latest numa/core release, v16—Google Groups," [retrieved from https://groups.google.com/forum/#!topic/fa.linux.kernel/YUnka2RelA0%5B1-25%5D on Aug. 2, 2017], Nov. 19, 2012, 1 page.

Yang et al., "Using Hypervisor to Provide Data Secrecy for User Applications on a Per-Page Basis," VEE'08 Mar. 5-7, 2008, Seattle, Washington, USA, 10 pages.

Yang, Yaodong, "On Optimizations of Virtual Machine Live Storage Migration for the Cloud," University of Nebraska, Computer Science and Engineering: Theses, Dissertations, and Student Research, Jul. 2016, 134 pages.

Zijlstra, Peter, "[PATCH 6/8] Sched, Numa, MM: Implement Constant, Per task Working Set Sampling (WSS) Rate," [retrieved from https://lkml.org/lkml/2012/11/12/323 on Aug. 2, 2017], Nov. 12, 2012, 3 pages.

* cited by examiner

TRACKING OF MEMORY PAGES BY A HYPERVISOR

TECHNICAL FIELD

Aspects of the disclosure relate generally to memory pages, and more specifically, relate to tracking of memory pages by a hypervisor.

BACKGROUND

A virtual machine (VM) may be considered a software-based emulation of computer hardware. For example, the virtual machine may operate based on computer architecture and functions of the computer hardware resources. Thus, the virtual machine may emulate a physical computing environment, but requests for CPU, memory, hard disk, network, and other hardware resources may be managed by a virtualization layer which translates these requests to the underlying physical computing hardware resources.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
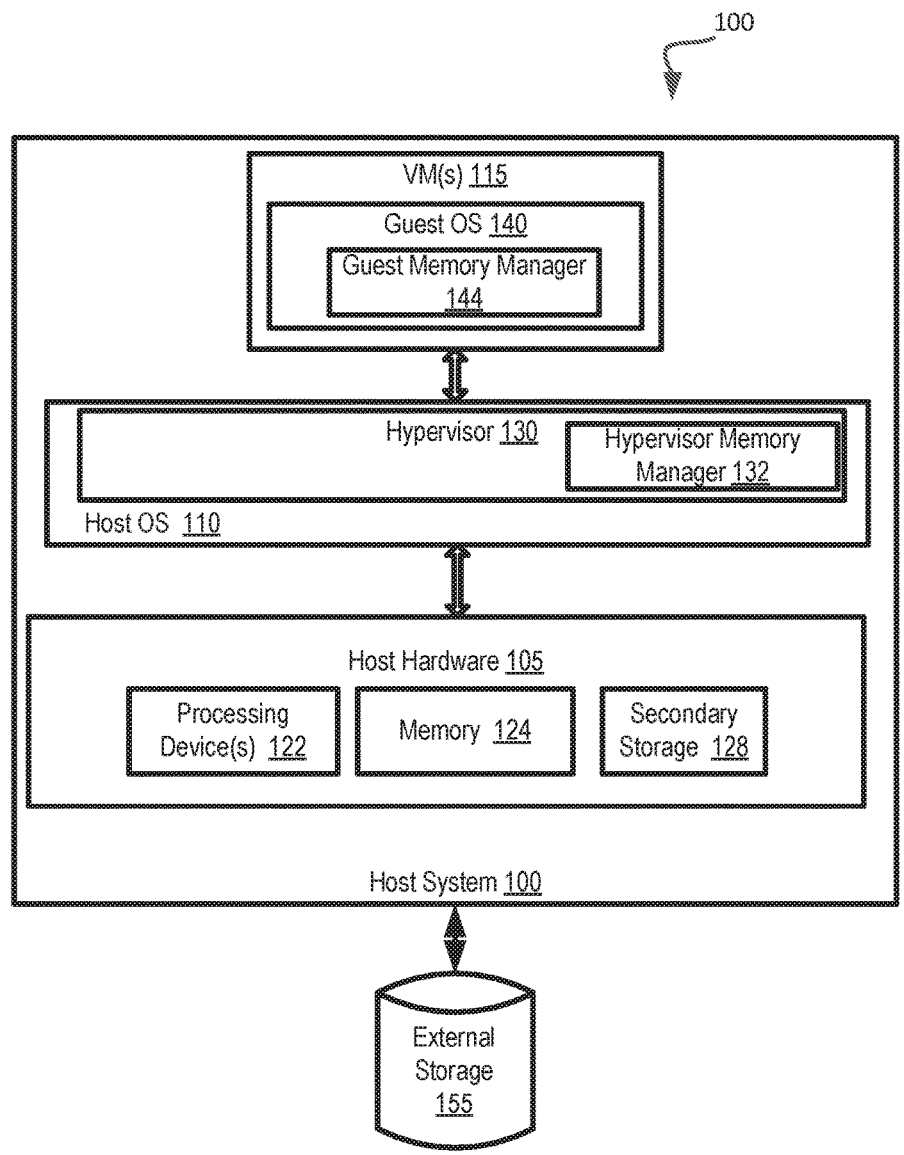
FIG. 1 illustrates an example system architecture in which embodiments of the disclosure may operate.

Embodiments of the disclosure relate to the tracking of memory pages by a hypervisor. In general, the hypervisor may manage one or more virtual machines that are associated with guest operating systems. The guest operating systems of the virtual machines may manage page tables for a virtual address space of the virtual machine. Furthermore, the hypervisor may manage page tables for its virtual address space that is assigned to the virtual address spaces of one or more virtual machines. The page tables tables used by a guest operating system of a virtual machine may not be used by the hypervisor. Instead, the page tables of the hypervisor may be mapped to the physical memory used by a host system that provides the hypervisor. However, the hypervisor may keep its page tables consistent with the page tables used by the virtual machines that are managed by hypervisor. For example, the hypervisor may discard or swap a memory page from its page table (e.g., the data from the discarded memory page is transferred from a main memory to a secondary memory and/or is deleted). Such discarding of the memory page may also be reflected in the page table of the corresponding virtual machine. For example, the virtual machine may indicate that a particular memory page from its page table may be discarded (e.g., the data of the memory page is no longer used by the virtual machine) and the hypervisor may subsequently discard the corresponding memory page from its own page table, and the memory page may then be used for storing new data by the virtual machine or another virtual machine managed by the hypervisor.

A guest operating system may notify the hypervisor that a particular memory page is not being used. In response to such a notification, the hypervisor may free the memory page by discarding the data of the memory page. Subsequently, memory resources may be freed and another memory page may be allocated to the virtual machine or another virtual machine when needed. However, if the guest operating system of the virtual machine notifies the hypervisor that a particular memory page is not being used, but later reuses this memory page, then the hypervisor may continue to operate from the initial notification and may discard the memory page. As a result, if the guest operating system is to use the data from the discarded memory page, a page fault may occur, resulting in the hypervisor performing additional operations to retrieve the discarded memory page and its data. Such operations may subsequently result in a decrease in performance of the virtual machine as opposed to if the memory page had not been discarded. To prevent such a condition, the guest operating system may enable dirty tracking of its memory pages. Dirty tracking may refer to a determination as to whether changes to a memory page of the guest operating system have been identified. For example, dirty tracking may indicate whether a memory page has been requested or used (e.g., read from or written to) by a virtual machine since the initial notification from the virtual machine to the hypervisor to discard at least one memory page. However, performing the dirty tracking operation across each memory page used by the virtual machine may utilize significant resources of the host system and result in a decrease in performance of the virtual machine.

Aspects of the present disclosure address the above and other deficiencies by tracking memory pages by a hypervisor that is driven or initiated by the guest operating system of a virtual machine. For example, the guest operating system may provide an indication of one or more memory pages that are associated with data used by the guest operating system. Such memory pages may be candidate memory pages to be discarded. The hypervisor that manages the virtual machine of the guest operating system may receive this indication with a request form the guest operating system to initiate dirty tracking of these one or more memory pages. As a result, the hypervisor may determine whether any of these memory pages have been used by the guest operating system after receiving the indication from the guest operating system. After performing the dirty tracking operation, the hypervisor may indicate the initiation of the dirty tracking operation to the guest operating system. Subsequently, the guest operating system may provide a subsequent one or more memory pages that are associated with data used by the guest operating system and that are subsequent candidate memory pages to be discarded. The hypervisor may receive this subsequent identification of memory pages and may discard the memory pages based on the dirty tracking operation. For example, if a memory page in the page table of the hypervisor has been marked (e.g., dirtied) as being used since the dirty tracking operation by the hypervisor began, then the memory page may not be discarded by the hypervisor. Otherwise, if the memory page in the page table of the hypervisor has not been marked as being used since the dirty tracking operation has been initiated, then the memory page may be discarded by the hypervisor. Thus, the guest operating system may indicate, to the hypervisor, which memory pages are to be tracked by the dirty tracking operation and when to begin the dirty tracking operation. The hypervisor may then discard memory pages from its page table and subsequently the page table of the guest operating system by using the status of memory pages from the hypervisor page table that indicates whether memory pages have been used by the guest operating system.

Advantages of the present disclosure include, but are not limited to, an increase in performance of the guest operating system and virtual machine. For example, since memory pages of the guest operating system may be less likely to be discarded if still being used by the guest operating system, then the occurrence of page faults may be reduced. Since a page fault may result in additional system operations, the reduction in occurrence of page faults for a guest operating system may increase the performance of the virtual machine that is associated with the guest operating system as data may be retrieved without such faults or time associated with the operations of a page fault.

FIG. 1 is an example system architecture of a host system 100 for various implementations of the disclosure. The host system 100 may host or execute one or more virtual machines (VMs) 115. The host system 100 may be a rackmount server, a workstation, a desktop computer, a notebook computer, a tablet computer, a mobile phone, a palm-sized computing device, a personal digital assistant (PDA), etc. The host system 100 includes host hardware 105, which may include one or more processing devices 122, memory 124, secondary storage 128, and other hardware components (e.g., input-output (I/O) devices). The memory 124 may include volatile memory devices (e.g., random access memory (RAM)), non-volatile memory devices (e.g., flash memory), and/or other types of memory devices. The secondary storage 128 may include mass storage devices, such as magnetic or optical storage based disks, tapes or hard drives. The host hardware 105 may also be coupled to external storage 155 via a direct connection or a local network. The host system 100 may be a single machine or multiple host machines arranged in a cluster.

The host system 100 includes a hypervisor 130 (also known as a virtual machine monitor (VMM)). In some embodiments, hypervisor 130 is a component of a host operating system 110. Alternatively, the hypervisor 130 may run on top of a host OS 110, or may run directly on host hardware 105 without the use of a host OS 110.

The hypervisor 130 manages system resources, including access to memory 124, I/O devices, and secondary storage 128. The hypervisor 130, though typically implemented in software, may emulate and export a bare machine interface (host hardware 105) to higher level software. Such higher level software may include a standard or real-time operating system (OS), may be a highly stripped down operating environment with limited operating system functionality, may not include traditional OS facilities, etc. The hypervisor 130 presents to other software (i.e., "guest" software) the abstraction of one or more virtual machines (VMs) 115, which may provide the same or different abstractions to various guest software (e.g., guest operating systems, guest applications, etc.).

The host system 100 hosts any number of virtual machines (VM) 115 (e.g., a single VM or multiple VMs). A virtual machine 115 is a combination of guest software that uses an underlying emulation of the host system 100 (e.g., as provided by hypervisor 130). The guest software (e.g., the virtual machine) may include a guest operating system 140, guest applications, guest device drivers, etc. Virtual machines 115 may be hardware emulation, full virtualization, para-virtualization, and operating system-level virtualization virtual machines. The virtual machines 115 may have the same or different guest operating systems 140, such as Microsoft® Windows®, Linux®, Solaris®, etc.

Each guest OS 140 includes a guest memory manager 144. The guest memory manager 144 allocates memory to processes and applications running within the VM 115 on which the guest OS 140 runs. The guest memory manager 144 allocates memory using memory pages, which are contiguous blocks of virtual memory (e.g., a 4K-byte block of memory). These memory pages may be allocated to the VM 115 by a hypervisor memory manager 132 as described in further detail below. In an implementation, the guest memory manager 144 and the hypervisor memory manager 132 are kernel level processes.

In some embodiments, the guest memory manager 144 touches the memory page (accesses at least one byte of physical memory mapped to the memory page) before allocating the memory page. Touching the memory page may trigger a page fault if the memory page has been swapped out (also referred to as paged out, discarded, or freed) to secondary storage 128 by a hypervisor memory manager 132. A page fault is raised when a program or a process (e.g., a program or process running in a virtual machine) attempts to access a memory page that is mapped in an address space of a process or operating system, but is not resident in physical memory. Paging out (or swapping out) a memory page is the act of copying the contents of a memory page to secondary storage 128 and removing those contents from physical memory that was mapped to the memory page. Paging in (or swapping in) a memory page is the act of writing the contents of a memory page from secondary storage to physical memory and mapping that physical memory to an address space of a process or application.

As shown in FIG. 1, the host OS 110 may include a hypervisor with a hypervisor memory manager 132 that manages virtual memory used by the virtual machines 115. The hypervisor memory manager 132 may also be a separate component of the host OS 110. Hypervisor memory manager 132 allocates memory to each VM 115. This may include over-committing the actual available physical memory 124. For example, the host system 100 may include 8 GB of RAM. However, the hypervisor memory manager 132 may allocate 2 GB of RAM to five different VMs 115.

To enable over-commitment of memory 124, hypervisor memory manager 132 may create a swap space in secondary storage 128 and/or external storage 155. When physical memory is needed by a VM 115 or by the host OS 110, the hypervisor memory manager 132 selects memory pages that have been allocated to another VM 115 and swaps out those memory pages into the swap space (stores the content of the memory pages in the swap space). When the VM 115 attempts to access a memory page that has been swapped out, a page fault is generated. In response to the page fault, hypervisor memory manager 132 may perform an I/O operation to read the contents of the memory page from the swap space, and may write the contents to a physical memory page. The VM 115 can then complete the access to the memory page.

In operation, the guest memory manager 144 may provide an indication for the hypervisor memory manager 132 to initiate dirty tracking of the memory pages used by a corresponding virtual machine 115. For example, the guest memory manager 144 may transmit an identification of one or more candidate free memory pages to the hypervisor memory manager 132 and a request to initiate dirty tracking of these candidate free memory pages. The hypervisor memory manager 132 may then initiate a dirty tracking operation for these candidate free memory pages. The dirty tracking operation may indicate whether a particular memory page of the candidate free memory pages has been used (e.g., read from or written to) by the guest operating system 140 since the dirty tracking operation has been initiated. The hypervisor memory manager 132 may provide an indication to the guest memory manager 144 that the dirty tracking operation has commenced on the previously identified candidate free memory pages. At a later time, the guest memory manager 144 may identify a second candidate free memory pages that indicates memory pages that may no longer be used by the guest OS 140. This identification of the second candidate free memory pages may be received by the hypervisor memory manager 132. Subsequently, memory pages may be freed, discarded, or swapped based on the status of the memory pages from the dirty tracking operation.

Figure 2:
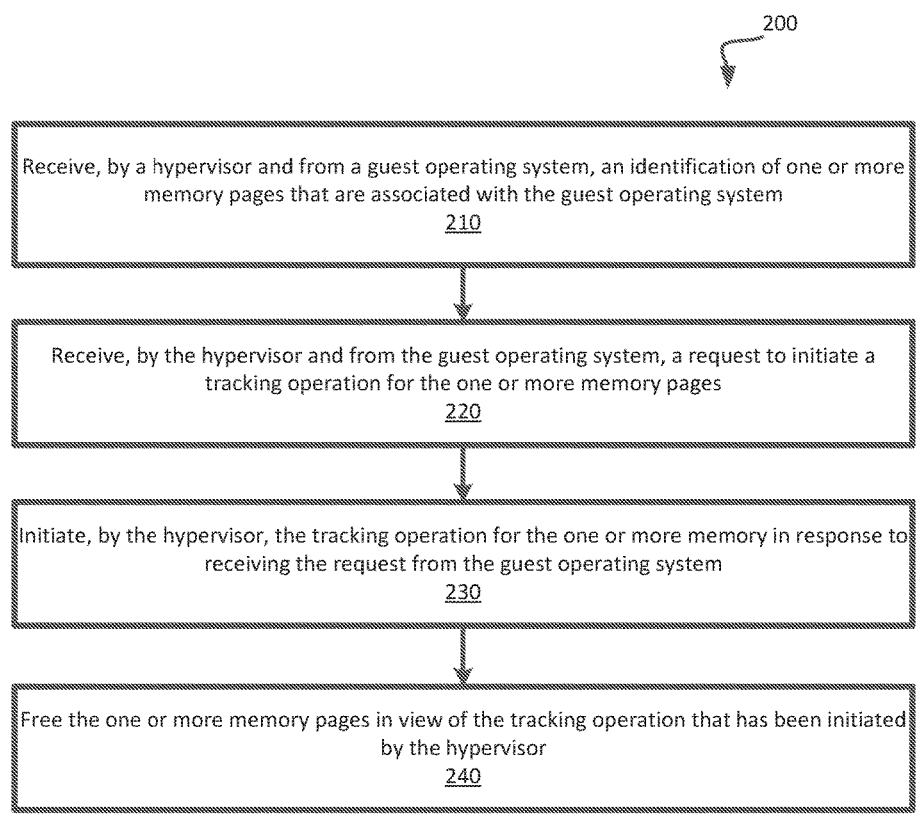
FIG. 2 is a flow diagram of an example method to free one or more memory pages in view of a tracking operation by a hypervisor in accordance with some embodiments of the disclosure.

FIG. 2 is a flow diagram of an example method 200 to free one or more memory pages in view of a tracking operation by a hypervisor. The method 200 may be performed by processing logic that may include hardware (e.g., processing device, circuitry, dedicated logic, programmable logic, microcode, etc.), software (e.g., instructions run or executed on a processing device), or a combination thereof. The method 200 may be performed by a hypervisor memory manager 132 of a hypervisor 130 as described with regard to FIG. 1.

As shown in FIG. 2, the method 200 may begin with the processing logic receiving an identification of one or more memory pages that are associated with a guest operating system (block 210). For example, the guest operating system may provide the identification of the one or more memory pages to a hypervisor that is managing the guest operating system. The one or more memory pages may be from a page table that is managed by the guest operating system. The identification of the memory pages may include memory addresses that correspond to the memory pages. In some embodiments, the identified one or more memory pages may be candidate memory pages to be discarded by the hypervisor. The processing logic may subsequently receive a request to initiate a tracking operation for the one or more memory pages (block 220). For example, the hypervisor may receive the request to initiate a dirty tracking operation of the memory pages that were previously identified by the guest operating system. The processing logic may further initiate the tracking operation for the one or more memory pages in response to receiving the request from the guest operating system (block 230). For example, the hypervisor may perform the dirty tracking operation for memory pages in its page table. The dirty tracking operation may indicate when a corresponding memory page has been changed or used. For example, the hypervisor may receive an indication when the guest operating system uses one of its memory pages. In response to the guest operating system using one of its memory pages, the hypervisor may provide a status indicator (e.g., dirty) for the memory page from its page table that has been used by the guest operating system. As a result, the hypervisor may provide a first status for memory pages that indicates that the corresponding memory pages have not been used by the guest operating system since the dirty tracking operation was initiated and a second status for other memory pages that indicate that the corresponding memory pages have been used by the guest operating system since initiating the dirty tracking operation. In some embodiments, the page table of the hypervisor may include memory pages that are associated with multiple virtual machines or multiple guest operating systems. The dirty tracking operation may be initiated to track whether memory pages associated with the guest operating system have been used and may not track whether other memory pages associated with other guest operating systems have been used. As such, the dirty tracking operation that is initiated may track a subset or a portion of the memory pages of the page table of the hypervisor. In some embodiments, the dirty tracking operation may be performed by write-protecting the memory pages so that if the guest operating system attempts a change to one of the write-protected memory pages, then an exit may occur. Thus, the detection of an exit associated with a guest operating system may correspond to an attempted change to a memory page. The memory pages may not be write-protected after the dirty tracking operation is completed or an indication to end the dirty tracking operation is received.

Referring to FIG. 2, the processing logic may further free the one or more memory pages in view of the tracking operation that has been initiated by the hypervisor (block 240). For example, the memory pages of the guest operating system that have been identified by the hypervisor as having been used may not be discarded while the memory pages of the guest operating system that have been identified by the hypervisor as not being used may be discarded. In some embodiments, after the initiating of the dirty tracking operation by the hypervisor, the hypervisor may provide an indication to the guest operating system that the dirty tracking operation for the previously identified memory pages has been initiated. The guest operating system may subsequently provide another identification of memory pages to the hypervisor. Such subsequently identified memory pages may include memory addresses that the guest operating system has identified as no longer being used by the guest operating system after the dirty tracking operation has been initiated by the hypervisor. In response to receiving the subsequently identified memory pages, the hypervisor may discard memory pages from the subsequently identified memory pages that have not been used since the dirty tracking operation was initiated. For example, memory pages that were marked as not being used may be discarded. Otherwise, the hypervisor may not discard memory pages from the subsequently identified memory pages that have been used since the dirty tracking operation was initiated. In some embodiments, the subsequently identified memory pages may include more memory pages than the previously identified memory pages. In such an instance, the additional memory pages may not be discarded by the hypervisor.

As such, a guest operating system may provide an indication to a hypervisor to initiate a dirty tracking operation for one or more memory pages that are associated with the guest operating system. The hypervisor may then perform a dirty tracking operation for a portion or proper subset of its memory pages that are assigned to the memory pages that the guest operating system has indicated may be candidate memory pages to be discarded.

Figure 3:
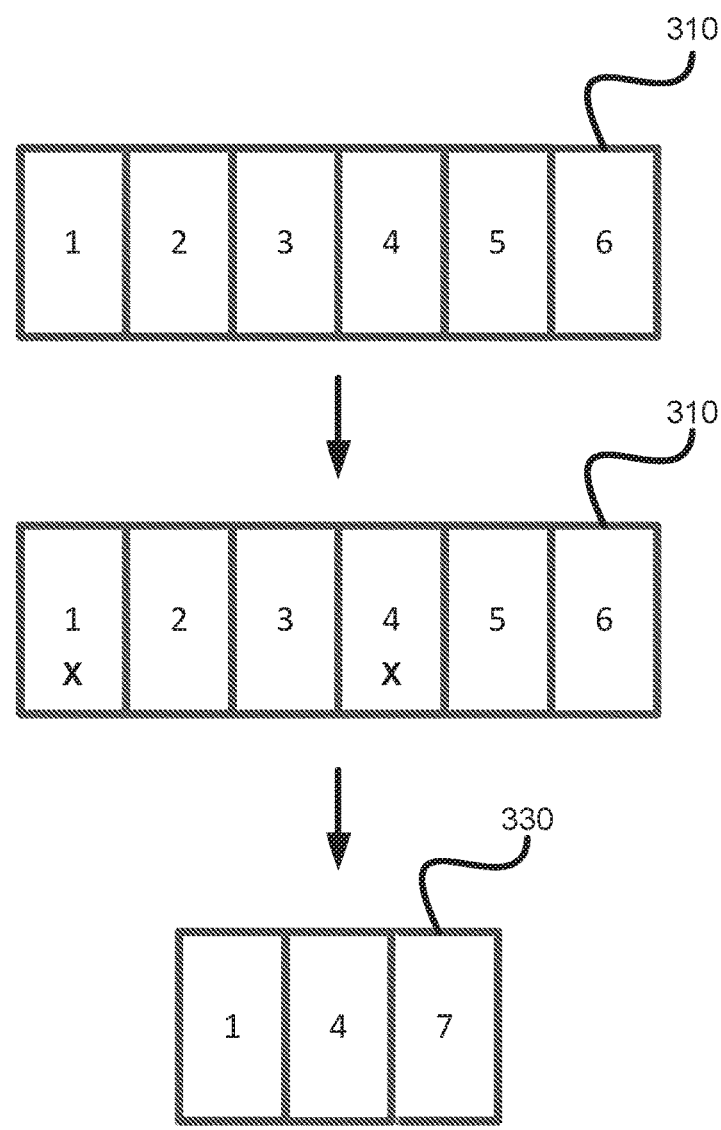
FIG. 3 illustrates the freeing of memory pages by using a dirty tracking operation of a hypervisor in accordance with some embodiments.

FIG. 3 illustrates the freeing of memory pages by using the dirty tracking operation of a hypervisor. In general, memory pages may be determined to be discarded or not discarded by the hypervisor memory manager 132 of a hypervisor 130 as described with regard to FIG. 1.

As shown in FIG. 3, a first set 310 of memory pages of the guest operating system may be identified to the hypervisor. The memory pages of the first set 310 may include memory pages that the guest operating system has identified as candidate memory pages to be discarded. For example, the memory pages of the first set 310 may not have been used by the guest operating system for a period of time or may have been indicated by an application that corresponding data of the memory pages is no longer used. Thus, the first set 310 may correspond to an initial set of memory pages that the guest operating system has identified as being candidates to be discarded by the hypervisor.

The hypervisor may initiate a dirty tracking operation after receiving the first set 310 of memory pages from the guest operating. For example, the hypervisor may identify that the memory page '1' and the memory page '4' have been used or modified by the guest operating system after the first set 310 of memory pages was identified. Furthermore, the hypervisor may identify that the remaining memory pages have not been used or modified by the guest operating system after the first set 310 of memory pages was identified. Thus, a status indicator for the memory page '1' and the memory page '4' may be set to indicate that these memory pages have been used by the guest operating system. Subsequently, the hypervisor may not discard the memory pages '1' and '4' that were used by the guest operating system since the first set 310 of memory pages were identified to the hypervisor by the guest operating system while discarding the remaining memory pages that were being tracked by the dirty tracking operation and that have been observed as not being used. As a result, the second set 320 of memory pages may include the memory pages '1' and '4' as these memory pages have been used by the guest operating system. A memory page '7' may be an additional memory page that was subsequently identified by the guest operating system but was not being tracked by the dirty tracking operation of the hypervisor. As a result, the memory page 7' may not be discarded. Thus, the second set 320 of memory pages may include memory pages of the guest operating system that were identified as having been used since the prior identification of memory pages and may include memory pages of the subsequent identification of memory pages that were not included in the previous identification and thus not subjected to the dirty tracking operation of the hypervisor.

Figure 4:
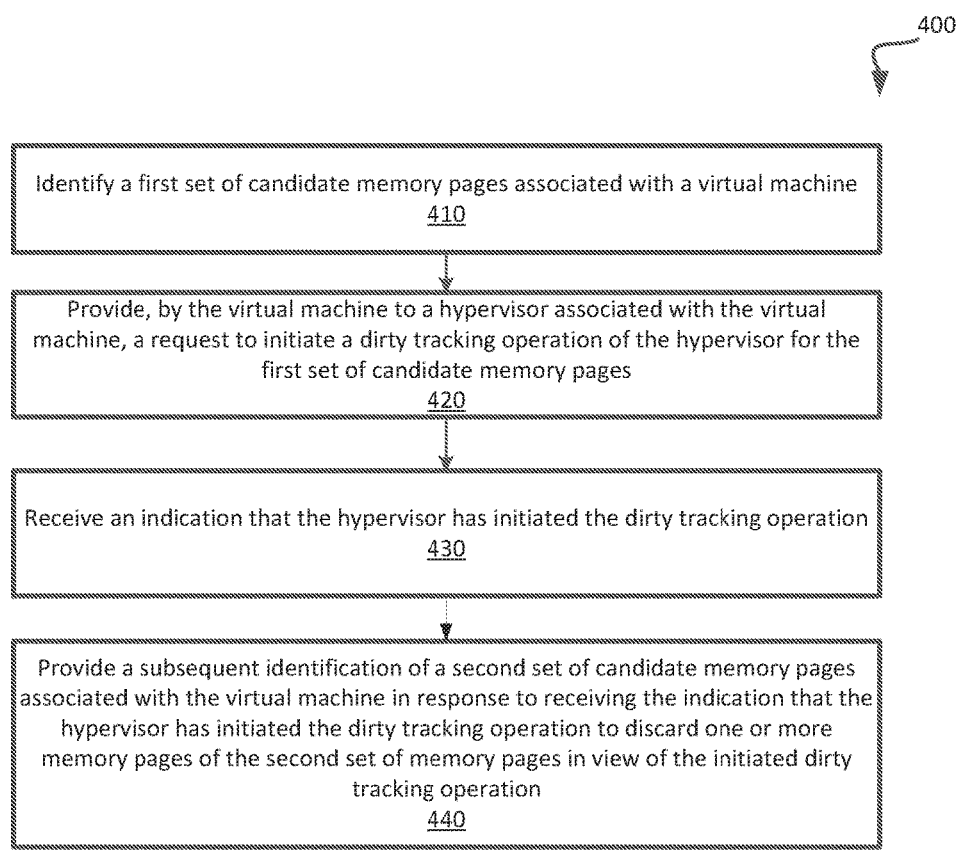
FIG. 4 is a flow diagram of an example method of a guest operating system providing a request to initiate a dirty tracking operation by a hypervisor in accordance with some embodiments of the disclosure.

FIG. 4 is a flow diagram of an example method 400 of a guest operating system providing a request to initiate a dirty tracking operation by a hypervisor. The method 400 may be performed by processing logic that may include hardware (e.g., processing device, circuitry, dedicated logic, programmable logic, microcode, etc.), software (e.g., instructions run or executed on a processing device), or a combination thereof. The method 400 may be performed by a hypervisor memory manager 132 of a hypervisor 130 as described with regard to FIG. 1.

As shown in FIG. 4, the method 400 may begin with the processing logic identifying a first set of candidate memory pages associated with a virtual machine (block 410). For example, the a operating system of the virtual machine may identify addresses of one or more memory pages that are not currently being used by the guest operating system. The processing logic may further provide a request to initiate a dirty tracking operation of a hypervisor for the first set of candidate memory pages (block 420). The request may be from the guest operating system of the virtual machine to the hypervisor. In some embodiments, the first set of candidate memory pages may be memory pages that are not being used by the guest operating system at a first time. The processing logic may further receive an indication that the hypervisor has initiated the dirty tracking operation (block 430). For example, the hypervisor may provide the indication to the guest operating system after receiving the request from the guest operating system to begin the dirty tracking operation for the first set of candidate memory pages at the first time. Subsequently, the processing logic may provide a subsequent identification of a second set of candidate memory pages associated with the virtual machine in response to receiving the indication that the hypervisor has initiated the dirty tracking operation to discard one or more of the second set of memory pages in view of the dirty tracking operation (block 440). The second set of candidate memory pages may be memory pages that are not being used by the guest operating system of the virtual machine at a second time that is after the first time and after the hypervisor has initiated the dirty tracking operation. In some embodiments, the identification of the second set of candidate memory pages may be provided to the hypervisor after a threshold period of time has elapsed since the hypervisor has initiated the dirty tracking operation. The identification may include addresses of the memory pages. For example, the addresses may correspond to addresses used by the guest operating system or the virtual machine.

Figure 5:
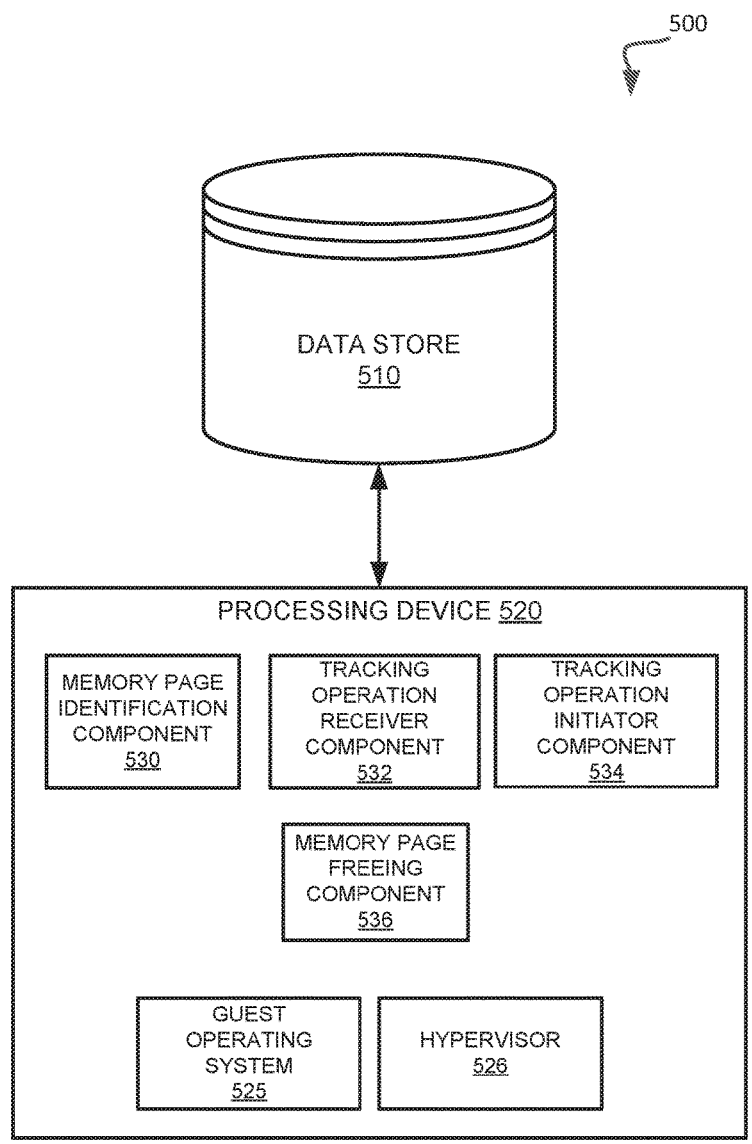
FIG. 5 illustrates an example apparatus in which implementations of the disclosure may operate in accordance with one or more aspects of the present disclosure.

FIG. 5 illustrates an example apparatus 500 in which implementations of the disclosure may operate. The apparatus 500 may be the same or similar to one of the distributed computing system, a network, or other computing devices. The data store 510 may include any non-persistent data storage (e.g., memory), persistent data storage (e.g., flash storage, hard drive, tape), another medium, or combination thereof that is capable of storing instructions for carrying out the operations of the components discussed herein. Furthermore, the data store 510 may store information (e.g., information identifying memory pages).

The apparatus 500 may include a processing device 520. The processing device 520 may include a memory page identification receiver component 530, a tracking operation receiver component 532, a tracking operation initiator component 534, and a memory page freeing component 536. Furthermore, the processing device 520 may provide or execute a guest operating system 525 and a hypervisor 526.

The memory page identification receiver component 530 may receive an identification of one or more memory pages. For example, a hypervisor 526 may receive an identification of one or more addresses for one or more memory pages from a guest operating system 525. The tracking operation receiver component 532 may receive a request to initiate a dirty tracking operation of the hypervisor 520. For example, the guest operating system 525 may provide the request to the hypervisor to determine whether any of the memory pages that were previously identified by the guest operating system were identified as being changed or modified by the hypervisor 520. The tracking operation initiator component 534 may begin the dirty tracking operation by the hypervisor 526. For example, the hypervisor may determine whether any of the previously identified memory pages have been observed to have been used. Furthermore, the memory page freeing component 536 may free one or more of the previously identified memory pages based on the tracking operation by the hypervisor.

Figure 6:
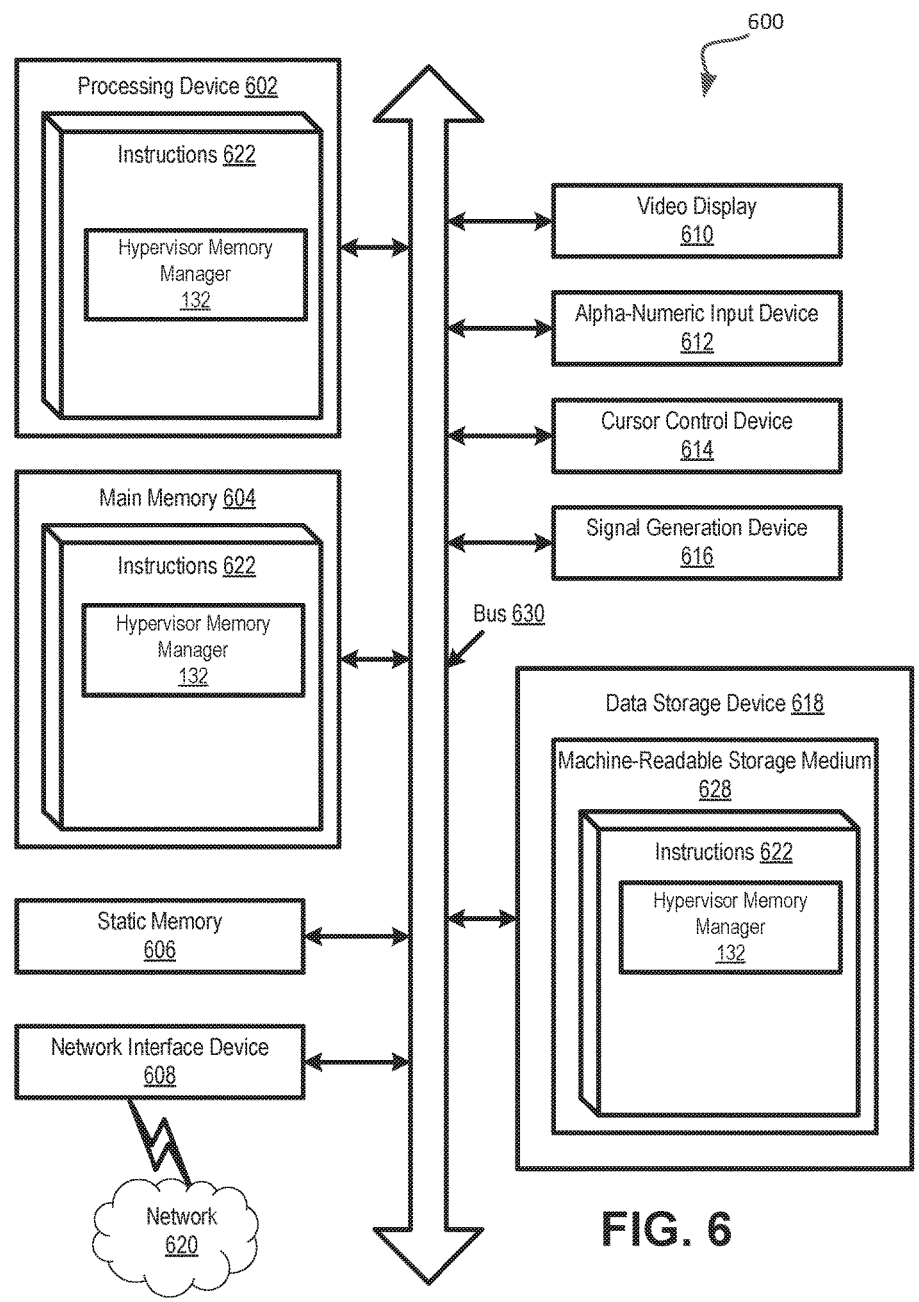
FIG. 6 illustrates a block diagram of an embodiment of a computer system in which some embodiments of the disclosure may operate.

FIG. 6 illustrates a block diagram of an embodiment of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a hypervisor memory manager (e.g., hypervisor memory manager 132 of FIG. 1) and/or a software library containing methods that call operations of a hypervisor memory manager. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A non-transitory machine-readable storage medium including data that, when accessed by a processing device, cause the processing device to:
   identify a first set of candidate memory pages associated with a virtual machine;
   provide, by the virtual machine to a hypervisor associated with the virtual machine, a request to initiate a dirty tracking operation of the hypervisor for the first set of candidate memory pages;
   receive an indication that the hypervisor has initiated the dirty tracking operation; and
   provide a subsequent identification of a second set of candidate memory pages associated with the virtual machine in response to receiving the indication that the hypervisor has initiated the dirty tracking operation to discard one or more memory pages of the second set of candidate memory pages in view of the initiated dirty tracking operation.

2. The non-transitory machine-readable storage medium of claim 1, wherein the identifying of the first set of candidate memory pages and the second set of candidate memory pages corresponds to addresses of the memory pages.

3. The non-transitory machine-readable storage medium of claim 1, wherein the receiving of the indication that the hypervisor has initiated the dirty tracking operation is in response to the hypervisor receiving the identification of the first set of candidate memory pages and the request from the virtual machine.

4. The non-transitory machine-readable storage medium of claim 1, wherein the identification of the first and second sets of memory pages corresponds to one or more memory pages with data that has been identified by the virtual machine as not being used by the virtual machine.

5. The non-transitory machine-readable storage medium of claim 1, wherein the dirty tracking operation identifies, for each of the one or more memory pages, whether a corresponding memory page has been used by the virtual machine since an initiation of the dirty tracking operation by the hypervisor, the dirty tracking operation corresponding to detecting an exit associated with the virtual machine using the corresponding memory page when the corresponding memory page is write-protected.

6. The non-transitory machine-readable storage medium of claim 5, wherein the dirty tracking operation is performed by the hypervisor and is initiated in response to the request from the virtual machine.

7. A method comprising:
   identifying a first set of candidate memory pages associated with a virtual machine;
   providing, by the virtual machine to a hypervisor associated with the virtual machine, a request to initiate a dirty tracking operation of the hypervisor for the first set of candidate memory pages;
   receiving an indication that the hypervisor has initiated the dirty tracking operation; and
   providing, by a processing device associated with the virtual machine, a subsequent identification of a second set of candidate memory pages associated with the virtual machine in response to receiving the indication that the hypervisor has initiated the dirty tracking operation to discard one or more memory pages of the second set of candidate memory pages in view of the initiated dirty tracking operation.

8. The method of claim 7, wherein the identifying of the first set of candidate memory pages and the second set of candidate memory pages corresponds to addresses of the memory pages.

9. The method of claim 7, wherein the receiving of the indication that the hypervisor has initiated the dirty tracking operation is in response to the hypervisor receiving the identification of the first set of candidate memory pages and the request from the virtual machine.

10. The method of claim 7, wherein the identification of the first and second sets of memory pages corresponds to one or more memory pages with data that has been identified by the virtual machine as not being used by the virtual machine.

11. The method of claim 7, wherein the dirty tracking operation identifies, for each of the one or more memory pages, whether a corresponding memory page has been used by the virtual machine since an initiation of the dirty tracking operation by the hypervisor, the dirty tracking operation corresponding to detecting an exit associated with the virtual machine using the corresponding memory page when the corresponding memory page is write-protected.

12. The method of claim 11, wherein the dirty tracking operation is performed by the hypervisor and is initiated in response to the request from the virtual machine.

13. A system comprising:
   a memory; and
   a processing device, operatively coupled with the memory, to:
   identify a first set of candidate memory pages associated with a virtual machine;
   provide, by the virtual machine to a hypervisor associated with the virtual machine, a request to initiate a dirty tracking operation of the hypervisor for the first set of candidate memory pages;
   receive an indication that the hypervisor has initiated the dirty tracking operation; and
   provide a subsequent identification of a second set of candidate memory pages associated with the virtual machine in response to receiving the indication that the hypervisor has initiated the dirty tracking operation to discard one or more memory pages of the second set of candidate memory pages in view of the initiated dirty tracking operation.

14. The system of claim 13, wherein the identifying of the first set of candidate memory pages and the second set of candidate memory pages corresponds to addresses of the memory pages.

15. The system of claim 13, wherein the receiving of the indication that the hypervisor has initiated the dirty tracking operation is in response to the hypervisor receiving the identification of the first set of candidate memory pages and the request from the virtual machine.

16. The system of claim 13, wherein the identification of the first and second sets of memory pages corresponds to one or more memory pages with data that has been identified by the virtual machine as not being used by the virtual machine.

17. The system of claim 13, wherein the dirty tracking operation identifies, for each of the one or more memory pages, whether a corresponding memory page has been used by the virtual machine since an initiation of the dirty tracking operation by the hypervisor, the dirty tracking operation corresponding to detecting an exit associated with the virtual machine using the corresponding memory page when the corresponding memory page is write-protected.

18. The system of claim 17, wherein the dirty tracking operation is performed by the hypervisor and is initiated in response to the request from the virtual machine.

* * * * *